(12) United States Patent
Hermanek

(10) Patent No.: US 6,254,699 B1
(45) Date of Patent: Jul. 3, 2001

(54) WEAR-RESISTANT QUASICRYSTALLINE COATING

(75) Inventor: Frank J. Hermanek, Indianapolis, IN (US)

(73) Assignee: Praxair S.T. Technology, Inc., Danbury, CT (US)

(*) Notice: Subject to any disclaimer, the term of this patent is extended or adjusted under 35 U.S.C. 154(b) by 0 days.

(21) Appl. No.: 09/270,133

(22) Filed: Mar. 16, 1999

(51) Int. Cl.⁷ .............................. B32B 15/20; C22C 21/12
(52) U.S. Cl. .................. 148/403; 428/548; 428/551; 428/650
(58) Field of Search .................... 428/548, 551, 428/650; 148/403

(56) References Cited

U.S. PATENT DOCUMENTS

| | | | |
|---|---|---|---|
| 5,204,191 | 4/1993 | Dubois et al. | 428/650 |
| 5,432,011 * | 7/1995 | Dubois et al. | |
| 5,433,978 | 7/1995 | Shield et al. | 427/456 |
| 5,571,344 * | 11/1996 | Dubois et al. | |
| 5,652,877 * | 7/1997 | Dubois et al. | |
| 5,851,317 | 12/1998 | Biner et al. | 148/403 |

OTHER PUBLICATIONS

Peterson, "A Quasicrystal Construction Kit", Science News, vol. 155 (1999) pp. 60–61 (no month).*

Sordelet "Synthesis Characterization and Physical Properties of Al–Cu–Fe Quasicrystalline Plasma Sprayed Coatings", Dissertation, Iowa State University (1995) (no month).*

* cited by examiner

Primary Examiner—Deborah Jones
Assistant Examiner—Jason Savage
(74) Attorney, Agent, or Firm—Blake T. Biederman

(57) ABSTRACT

A thermally sprayed coating formed with a quasicrystal-containing alloy, the alloy consisting essentially of, by weight percent, 10 to 45 Cu, 7 to 22 Fe, 0 to 30 Cr, 0 to 30 Co, 0 to 20 Ni, 0 to 10 Mo, 0 to 7.5 W and balance aluminum with incidental impurities. The alloy contains at least 50 weight percent ψ phase. The coating has a macro hardness of at least HR15N 75.

12 Claims, No Drawings

WEAR-RESISTANT QUASICRYSTALLINE COATING

BACKGROUND OF THE INVENTION

1. Field of the Invention

The present invention relates to aluminum-copper-iron quasicrystal alloys and in particular to wear-resistant quasicrystal coatings that exhibit non-adhesive properties.

2. Description of Related Art

Quasicrystals are materials whose structure cannot be understood within classic crystallographic methodology. These quasiperiodic structures have a long-range orientation order, but lack transitional periodicity. Conventional crystals consist of repeated copies of a single geometric atomic arrangement—a unit-cell stacked upon each other like bricks. Quasicrystals, on the other hand, while also being built up from a single type of atomic clusters, differ in that adjacent clusters overlap, sharing atoms with their neighbors. When clusters overlap by sharing atoms (quasiperiodic packing), they produce denser atomic arrays than conventional, periodic, repeated packing patterns.

The non-periodic structure of quasicrystal yields a broad, previously unobtainable range of physical properties embodied within a single material. Quasicrystals exhibit poor thermal conductivity while remaining stable up to about 1100° C. Thus, a thin layer on a heat-conducting surface will distribute heat evenly eliminating "hot spots". These hard coatings promote wear and scratch resistance. Furthermore, due to their low coefficient of friction and electronic structure (low surface energy), they possess non-adhesive properties. Finally, they offer resistance to both corrosion and oxidation.

Researchers have identified over eight hundred different quasicrystal alloys. Many of these alloys contain a combination of aluminum, copper and iron. The Al—Cu—Fe alloys yield the specific icosahedral quasicrystal identified in atomic percent as $Al_{65}Cu_{20}Fe_{15}$. (This specification expresses all compositions in weight percent, unless specifically stated otherwise). Furthermore, in some instances these alloys contain additional alloying elements such as, chromium, cobalt and nickel. This enables the alloy to accommodate specific operating conditions. For example, DuBois et al., in U.S. Pat. No. 5,204,191, describe several Al—Cu—Fe alloys containing quasicrystalline phases.

Regardless of chemistry however, quasicrystals do not lend themselves to conventional fabrication. They can not be formed or readily cast; however, they can be reduced to powder and thermally sprayed to form an adherent, useful coating. As far as known however, none of these alloys have established widespread commercial usage.

It is an object of this invention to produce an Al—Cu—Fe quasicrystal alloy coating having increased hardness for improved wear resistance.

It is a further object of this invention to produce an Al—Cu—Fe quasicrystal alloy coating having non-adhesive properties and oxidation resistance.

It is a further object of this invention to produce an Al—Cu—Fe quasicrystal alloy coating having a smooth-high density surface.

SUMMARY OF THE INVENTION

A thermally sprayed coating formed with a quasicrystal-containing alloy, the alloy consisting essentially of, by weight percent, 10 to 45 Cu, 7 to 22 Fe, 0 to 30 Cr, 0 to 30 Co, 0 to 20 Ni, 0 to 10 Mo, 0 to 7.5 W and balance aluminum with incidental impurities. The alloy contains at least 50 weight percent $\psi$ phase. The coating has a macro hardness of at least about HR15N 75.

DESCRIPTION OF PREFERRED EMBODIMENT

The coating consists of a wear resistant Al—Cu—Fe alloy having at least about 50 weight percent $\psi$ phase thermally sprayed at a rapid rate sufficient to avoid detrimental quantities of $\delta$ phase. Advantageously, this alloy contains at least about 60 weight percent $\psi$ phase. Typically, it contains about 60 to 90 weight percent $\psi$ phase. Most advantageously, the alloy contains at least 70 weight percent $\psi$ phase. The thermally sprayed coating possesses excellent hardness, density and surface smoothness. Advantageously, the coating has a roughness of less than about 240 Ra and a porosity of less than about 5 percent. Furthermore, this quasicrystalline alloy advantageously contains chromium or cobalt for corrosion resistance.

Aluminum, copper, iron and chromium were vacuum melted and inert gas atomized. The powder analyzed, by weight percent, 17.5 Cu, 13.3 Fe, 15.3 Cr and balance aluminum. This powder was fully spherical and free flowing. Table 1 lists typical properties of the inert gas atomized AlCuFeCr quasicrystal powder after sizing.

TABLE 1

| | | |
|---|---|---|
| Size | +75 µm | 0.02% |
| | +63 µm | 5.40% |
| | −63 µm | 94.58% |
| Apparent Density | | 2.14 g/cm³ |
| Flow Rate (ASTM B213) | | 30 Seconds |

Due to the alloy's aperiodic lattice structure, x-ray diffraction (XRD) identified the quasicrystals. The positions of the quasicrystal or (icosahedral ($\psi$)) phase are roughly at 23, 25, 41, 44, 62.5, and 75—an icosahedral is a polygon having 20 faces and a decagon is a polygon having 10 angles and 10 faces. As-atomized, sized powder showed only a minor amount of $\psi$ phase. Rather, a decagonal phase ($\delta$) predominated. The presence of two (2) phases was attributed to the rate of cooling experienced in going from liquid to solid. Cooling rate, and subsequent powder particle solidification, greatly affected resulting phase equilibria. At very fast rates the metastable $\psi$ is formed; if solidification is slowed, the $\delta$-phase or its approximates form. Differential thermal analysis performed on the powder indicated a melting temperature of about 1044° C.

When reduced to powder, these quasicrystals facilitate thermal spraying with various types of equipment. This includes plasma, HVOF, detonation and other types of thermal spraying equipment. However, for this example plasma was selected as the sole means of application. The equipment used to apply the coatings was the Praxair SG-100 plasma gun. The gun was mounted onto an ABB IRB 2400 robot's arm to facilitate automatic spraying and to ensure consistency.

A "hard" coating, one that is adherent and dense, was applied using the SG-100 in the Mach 1 mode with argon and helium as the plasma forming gases. Starting parameters of Table 2 consisted of those established for pure aluminum-copper-iron quasicrystals.

TABLE 2

| | |
|---|---|
| Anode | 2083-358 |
| Cathode | 2083-112 |
| Gas Injector | 2083-113 |
| Current | 800 Amps |
| Primary Gas (Ar) | 37.8 l/min |
| Secondary Gas (He) | 20.0 l/min |
| Carrier Gas (Ar) | 5.6 l/min |
| Powder Feed Rate | 20.0 g/min |
| Spray Distance | 76 mm |
| Powder Size | −45 µm + 5 µm |

Listed are eleven parametric variables. Four are active and non-controllable. These include anode, cathode, gas injector and powder size. Two, voltage and carrier gas flow are active and controllable; however, the former is regulated through the secondary gas flow while the latter was permitted to remain fixed. Five active and controllable parameters remained: amperage, primary and secondary gas flows, powder feed rate and spray distance. Since these parameters were insufficient to optimize the coating's hardness, gun traverse rate or amount deposited per pass was added.

The Mach 1 coatings were applied to a thickness of 0.51 to 0.74 mm. Among the coating attributes evaluated were micro- ($DPH_{300}$) and macro hardness (HR15N) testing; microstructure, including density and oxide content as determined using image analysis; surface roughness; XRD for phase distribution; and tensile/bond testing. Based upon macro hardness results alone, an optimized set of spray parameters was derived. Along with gun traverse rate, the six active and controllable parameters from Table 2 were given high and low ranges. Table 3 illustrates the controlled parameters.

TABLE 3

| | | | |
|---|---|---|---|
| Amperage | 750 | 800 | 850 |
| Secondary | 15 | 20 | 25 |
| Primary | 32.8 | 37.8 | 42.8 |
| Traverse | 250 | 305 | 355 |

Table 4 below shows the results from these tests in a three level orthogonal array with the Rockwell 15N hardness reported for each spray run and the resulting surface roughness or texture.

TABLE 4

| Test | Amps | Secondary Gas (He) l/min | Primary Gas (Ar) l/min | Powder Feed Rate g/min | Spray Distance mm | Gun Traverse Rate cm/min | Hardness HR15N | Texture Ra |
|---|---|---|---|---|---|---|---|---|
| 1 | 750 | 15 | 32.8 | 15 | 76 | 250 | 78.2 | 322 |
| 2 | 750 | 15 | 32.8 | 15 | 89 | 305 | 77.5 | 269 |
| 3 | 750 | 15 | 32.8 | 15 | 102 | 355 | 77.1 | 282 |
| 4 | 750 | 20 | 37.8 | 20 | 76 | 250 | 73.4 | 285 |
| 5 | 750 | 20 | 37.8 | 20 | 89 | 305 | 74.0 | 267 |
| 6 | 750 | 20 | 37.8 | 20 | 102 | 355 | 77.6 | 268 |
| 7 | 750 | 25 | 42.8 | 25 | 76 | 250 | 69.4 | 303 |
| 8 | 750 | 25 | 42.8 | 25 | 89 | 205 | 74.7 | 275 |
| 9 | 750 | 25 | 42.8 | 25 | 102 | 355 | 75.2 | 298 |
| 10 | 800 | 15 | 37.8 | 25 | 76 | 305 | 75.3 | 284 |
| 11 | 800 | 15 | 37.8 | 25 | 89 | 355 | 71.7 | 252 |
| 12 | 800 | 15 | 37.8 | 25 | 102 | 250 | 75.9 | 252 |
| 13 | 800 | 20 | 42.8 | 15 | 76 | 305 | 80.5 | 302 |
| 14 | 800 | 20 | 42.8 | 15 | 89 | 355 | 76.6 | 313 |
| 15 | 800 | 20 | 42.8 | 15 | 102 | 250 | 71.4 | 312 |
| 16 | 800 | 25 | 32.8 | 20 | 76 | 305 | 77.0 | 278 |
| 17 | 800 | 25 | 32.8 | 20 | 89 | 355 | 75.6 | 244 |
| 18 | 800 | 25 | 32.8 | 20 | 102 | 250 | 74.1 | 245 |
| 19 | 850 | 15 | 42.8 | 20 | 76 | 355 | 78.9 | 305 |
| 20 | 850 | 15 | 42.8 | 20 | 89 | 250 | 75.3 | 291 |
| 21 | 850 | 15 | 42.8 | 20 | 102 | 305 | 73.3 | 325 |
| 22 | 850 | 20 | 32.8 | 25 | 76 | 355 | 74.6 | 264 |
| 23 | 850 | 20 | 32.8 | 25 | 89 | 250 | 73.6 | 266 |
| 24 | 850 | 20 | 32.8 | 25 | 102 | 305 | 75.6 | 248 |
| 25 | 850 | 25 | 37.8 | 15 | 76 | 355 | 73.7 | 359 |
| 26 | 850 | 25 | 37.8 | 15 | 89 | 250 | 73.4 | 284 |
| 27 | 850 | 25 | 37.8 | 15 | 102 | 305 | 75.9 | 348 |
| Baseline | | | | | | | 73.0 | 268 |

Inserted into a Taguchi L27, three-level orthogonal array, the high, median and low levels of each parametric variable, were evaluated—with particular attention to their interaction with each other. The parameter response table and calculations used to predict the coating's hardness are shown in Tables 5 and 6. Table 5 below illustrates a response table containing the calculated average hardness for the active-controllable parameters at three levels.

TABLE 5

| | Hardness (HR15N) | | |
|---|---|---|---|
| Amps A | 75.23 | 75.34 | 75.0 |
| Secondary B | 75.91 | 75.26 | 74.41 |
| Primary C | 75.92 | 74.62 | 75.03 |
| Feed Rate D | 76.11 | 75.47 | 74.0 |
| Distance E | 75.67 | 74.71 | 75.2 |
| Traverse F | 73.86 | 76.06 | 75.67 |

Table 6 shows calculations for high hardness ($\mu$) based upon results of Table 5.

TABLE 6

$\mu$ = T + (A2 − T) + (B1 − T) + (C1 − T) + (D1 − T) + (E1 − T) + (F2 − T)
$\mu$ = 75.19 + (75.34 − 75.19) + (75.91 − 75.19) + (75.92 − 75.19) + (76.11 − 75.19) + (75.67 − 75.19) + (76.06 − 75.19)
$\mu$ = 75.19 + (0.15) + (0.72) + (0.73) + (0.92) + (0.48) + (0.87)
$\mu$ = 79.06 HNR15N

Referring to the response table and selecting the highest hardness values for a given parameter setting the optimum values, to deposit a coating with a typical hardness of HR15N 79.06, are presented in Table 7.

TABLE 7

| | |
|---|---|
| Amperage | 800 |
| Secondary (He) | 15 l/min |
| Primary (Ar) | 32.8 l/min |
| Feed Rate | 15 g/min |
| Carrier Gas (Ar) | 5.6 l/min |
| Spray Distance | 76 mm |
| Traverse Rate | 250 cm/min |

TABLE 8

| | | |
|---|---|---|
| PH$_{300}$ | | 353 (Rc36) |
| HR15N | | 78.0 (Rc36) |
| Density | | 97.0% |
| UTS | AISI 316 | 49.88 MPa |
| UTS | SAE 4140 | 41.51 MPa |
| UTS | 6061T6 | 17.93 MPa |
| Texture | | 232 Ra |
| Deposit Efficiency | | 66% |

Table 8 represents the average coating properties derived from the optimized parameters of Table 7. From the response tables, those parameters deemed most likely to produce a hard, dense, well bonded quasicrystalline coating high in the icosahedral ($\psi$) phase, are presented in Table 8.

The baseline coating contained approximately 70 weight percent $\psi$-phase (icosahedral) with β-phase (cubic) and δ-phases (decagonal). The width of the peaks suggested that the coating was very fine grained (<1 $\mu$m). The baseline coating contained porosity and fine trans-splat cracking. The optimized coating, thought to be in a non-equilibrium state, contained 70 weight percent $\psi$-phase and β-phase. Some δ-phase was noted on the left side of the highest intensity peak. The optimized parameters improved the density, but the trans-splat cracking remained.

Spherical, free flowing, inert gas atomized AlCuFeCr alloy powder does not contain a high percentage of the aperiodic, icosahedral ($\psi$) phase i.e. quasicrystalline in three (3) directions. Rather, due to its cooling rate, it is comprised of substantial amounts of a decagonal (δ) phase and a cubic (β) phase. While these are both quasicrystalline phases, they do not embrace the aperiodic lattice of the $\psi$phase. Nevertheless, when plasma sprayed, under the proper conditions, they can revert to $\psi$ phase—the electronic structure of the $\psi$ phase contributes to a low surface energy and hence good release properties.

Table 9 below provides "about" the thermally sprayed coating's composition, in weight percent.

TABLE 9

| Element | Broad | Intermediate | Narrow |
|---|---|---|---|
| Al | Balance* | Balance* | Balance* |
| Cu | 10–45 | 12–24 | 15–20 |
| Fe | 7–22 | 10–20 | 10–16 |
| Cr | 0–30 | 5–25** | 10–20 |
| Co | 0–30 | 0–20** | 0–15 |
| Ni | 0–20 | 0–15 | 0–10 |
| Mo | 0–10 | 0–7.5 | 0–5 |
| W | 0–7.5 | 0–6 | 0–5 |

*Plus incidental impurities.
**Cr + Co is at least 10.

The parametric manipulation may also alter the alloy's atomic structure. However, from the data herein, it is apparent that as both thermal and kinetic energies are varied, cooling rates are altered and the subsequently produced coatings reflect those changes. Furthermore, those properties initially targeted for modification were appreciably improved. For example, hardness improved to a level of at least HR15N 75. Most advantageously, the alloy has a hardness of at least HR15N 78. In addition, by spraying in the Mach 1-high velocity mode, the powder was sufficiently heated and cooled to transform the δ, decagonal phase to the low frictional $\psi$, icosahedral phase.

Referring to the coating's metallography, the extensive cracking within individual splats was unanticipated. While icosahedral quasicrystals are brittle at ambient temperature, they do plastically deform at higher temperatures. Thus, it was not recognized that individual splats would formatively comply with the roughened substrate by shearing and cracking rather than a ductile type molding. It was believed that the in-flight droplets were sufficiently heated that they would readily conform to the substrate's contour—this was not the case. Quasicrystals have very poor thermal conductivity and therefore any level of inputted thermal energy should be considered when spraying. This may be of concern when using various high velocity appliances as the primary application devices.

The potential uses of quasicrystal coatings include: non-stick surfaces for cookware; steam iron sole plates; thermal barrier underlayments; lubricating and bearing surfaces; non-stick paper and glass manufacturing rolls; piston rings; anti-fretting protection for airfoil dovetails; sliding wear applications such as valves and gates; clutch plates; and air conditioner compressor "wobble" plates. These coatings facilitate spraying of both metallic and non-metallic substrates. Anywhere that a highly lubricious surface or a long-lived Teflon (Teflon is a trademark of DuPont for fluorinated ethylene propylene) substitute is required presents opportunities for quasicrystalline coatings. These coatings may be further enhanced by the addition of hard particles such as carbides, metals, nanocarbides, nitrides, oxides and intermetallic compounds. Specific examples include: alumina, chromia, molybdenum, and carbides of tungsten, chromium, titanium and vanadium.

The coating has a hardness of at least HR15N 75 for excellent wear resistance. Furthermore, the quasicrystalline alloy contains at least 50 weight percent $\psi$ phase for excellent non-adhesive properties. Finally, the coating forms a smooth surface of less than 240 Ra and has a porosity of less than 5 percent. The coating's combined properties are useful for a variety of wear resistant applications.

Although the invention has been described in detail with reference to a certain preferred embodiment, those skilled in the art will recognize that there are other embodiments of the invention within the spirit and the scope of the claims.

What is claimed is:

1. A thermally sprayed coating formed with a quasicrystal-containing alloy, the coating having a composition, the composition consisting essentially of, by weight percent, about 10 to 20 Cu, about 7 to 22 Fe, about 0 to 30 Cr, about 0 to 30 Co, about 0 to 20 Ni, about 0 to 10 Mo, about 0 to 7.5 W and balance aluminum with incidental impurities; the coating including ψ, δ and β phases; the coating having at least about 50 weight percent ψ phase; and the coating having a macro hardness of at least about HR15N 75.

2. The coating of claim 1 wherein the coating has a porosity of less than about 5 percent and a roughness of less than about 240 Ra.

3. The coating of claim 1 wherein the alloy contains at least about 60 weight percent ψ phase.

4. The coating of claim 1 wherein the coating contains hard particles selected from the group consisting of carbides, metals, nanocarbides, nitrides, oxides and intermetallic compounds.

5. A thermally sprayed coating formed with a quasicrystal-containing alloy, the coating having a composition, the composition consisting essentially of, by weight percent, about 12 to 20 Cu, about 10 to 20 Fe, about 5 to 25 Cr, about 0 to 20 Co, at least about 10 total Cr and Co, about 0 to 15 Ni, about 0 to 7.5 Mo, about 0 to 6 W and balance aluminum with incidental impurities; the coating including ψ, δ and β phases; the coating having at least about 50 weight percent ψ phase; and the coating having a macrohardness of at least about HR15N 78.

6. The coating of claim 5 wherein the coating has a porosity of less than about 5 percent and a roughness of less than about 240 Ra.

7. The coating of claim 5 wherein the alloy contains at least about 60 weight percent ψ phase.

8. The coating of claim 5 wherein the coating contains hard particles selected from the group consisting of carbides, metals, nanocarbides, nitrides, oxides and intermetallic compounds.

9. A thermally sprayed coating formed with a quasicrystal-containing alloy, the coating having a composition, the composition consisting essentially of, by weight percent, about 15 to 20 Cu, about 10 to 16 Fe, about 10 to 20 Cr, about 0 to 10 Co, about 0 to 10 Ni, about 0 to 5 Mo, about 0 to 5 W and having balance aluminum with incidental impurities; the coating including ψ, δ and β phases; the coating having at least about 50 weight percent ψ phase; and the coating having a macrohardness of at least about HR15N 78.

10. The coating of claim 9 wherein the coating has a porosity of less than about 5 percent and a roughness of less than about 240 Ra.

11. The coating of claim 9 wherein the alloy contains at least about 70 weight percent ψ phase.

12. The coating of claim 9 wherein the coating contains hard particles selected from the group consisting of carbides, metals, nanocarbides, nitrides, oxides and intermetallic compounds.

* * * * *